United States Patent
Shirley et al.

(10) Patent No.: US 10,400,545 B2
(45) Date of Patent: Sep. 3, 2019

(54) FLOW CONTROL ASSEMBLY

(71) Applicant: Cameron International Corporation, Houston, TX (US)

(72) Inventors: Brandon Blake Shirley, Cypress, TX (US); Kirk Paul Guidry, Cypress, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 15/643,015

(22) Filed: Jul. 6, 2017

(65) Prior Publication Data

US 2018/0010420 A1    Jan. 11, 2018

Related U.S. Application Data

(60) Provisional application No. 62/359,984, filed on Jul. 8, 2016.

(51) Int. Cl.
| | |
|---|---|
| *E21B 34/02* | (2006.01) |
| *E21B 34/04* | (2006.01) |
| *F16K 15/06* | (2006.01) |
| *F16K 15/18* | (2006.01) |
| *F16K 27/02* | (2006.01) |
| *F16L 29/02* | (2006.01) |
| *E21B 33/068* | (2006.01) |

(52) U.S. Cl.
CPC ............ *E21B 34/02* (2013.01); *E21B 33/068* (2013.01); *E21B 34/04* (2013.01); *F16K 15/063* (2013.01); *F16K 15/18* (2013.01); *F16K 27/0209* (2013.01); *F16L 29/02* (2013.01)

(58) Field of Classification Search
CPC ........ E21B 33/068; E21B 34/02; E21B 34/04; E21B 33/043; F16K 15/063; F16K 15/18; F16K 27/0209; F16L 29/02
See application file for complete search history.

(56) References Cited

U.S. PATENT DOCUMENTS

| | | | | |
|---|---|---|---|---|
| 3,466,001 | A | * | 9/1969 | Nelson ................ E21B 33/0375 251/25 |
| 4,662,603 | A | * | 5/1987 | Etheridge ............... E21B 34/02 137/488 |
| 6,050,338 | A | | 4/2000 | Watkins |
| 7,566,045 | B2 | * | 7/2009 | June .................... E21B 33/0043 137/625.48 |

FOREIGN PATENT DOCUMENTS

| | | | |
|---|---|---|---|
| GB | 2132728 A | 7/1984 | |
| GB | 2132728 B * | 2/1985 | ......... E21B 33/0355 |

OTHER PUBLICATIONS

PCT International Search Report & Written Opinion for PCT Application No. PCT/US2017/041209 dated Nov. 16, 2017; 14 pgs.

* cited by examiner

*Primary Examiner* — James G Sayre (74) *Attorney, Agent, or Firm* — Fletcher Yoder, P.C.

(57) ABSTRACT

A system includes a flow control assembly having a first portion configured to be positioned within and coupled to a first passageway formed in a wellhead component and a second portion configured to be coupled to a second passageway formed in a body that is configured to be coupled to the wellhead component. An actuator of the second portion is configured to drive a valve member of the first portion into an open position to enable fluid flow across the flow control assembly.

19 Claims, 6 Drawing Sheets

FLOW CONTROL ASSEMBLY

CROSS-REFERENCE TO RELATED APPLICATION

This application claims the benefit of U.S. Provisional Patent Application No. 62/359,984, filed Jul. 8, 2016, entitled "FLOW CONTROL ASSEMBLY," which is incorporated by reference herein in its entirety for all purposes.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Natural resources, such as oil and gas, are used as fuel to power vehicles, heat homes, and generate electricity, in addition to a myriad of other uses. Once a desired resource is discovered below the surface of the earth, drilling and production systems are often employed to access and extract the resource. These systems may be located onshore or offshore depending on the location of a desired resource. Further, such systems generally include a wellhead through which the resource is extracted. These wellheads may have wellhead assemblies that include a wide variety of components and/or conduits, such as various casings, hangers, valves, fluid conduits, and the like, that control drilling and/or extraction operations.

In some typical systems, a passageway may extend through a wellhead component to facilitate fluid injection into and/or fluid extraction from a wellbore. In some cases, a flow control assembly, such as a valve removal (VR) plug assembly, may be positioned within the passageway. The construction of such flow control assemblies may affect fluid flow into and out of the wellbore, and thus, it would be desirable to improve the construction of these flow control assemblies.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
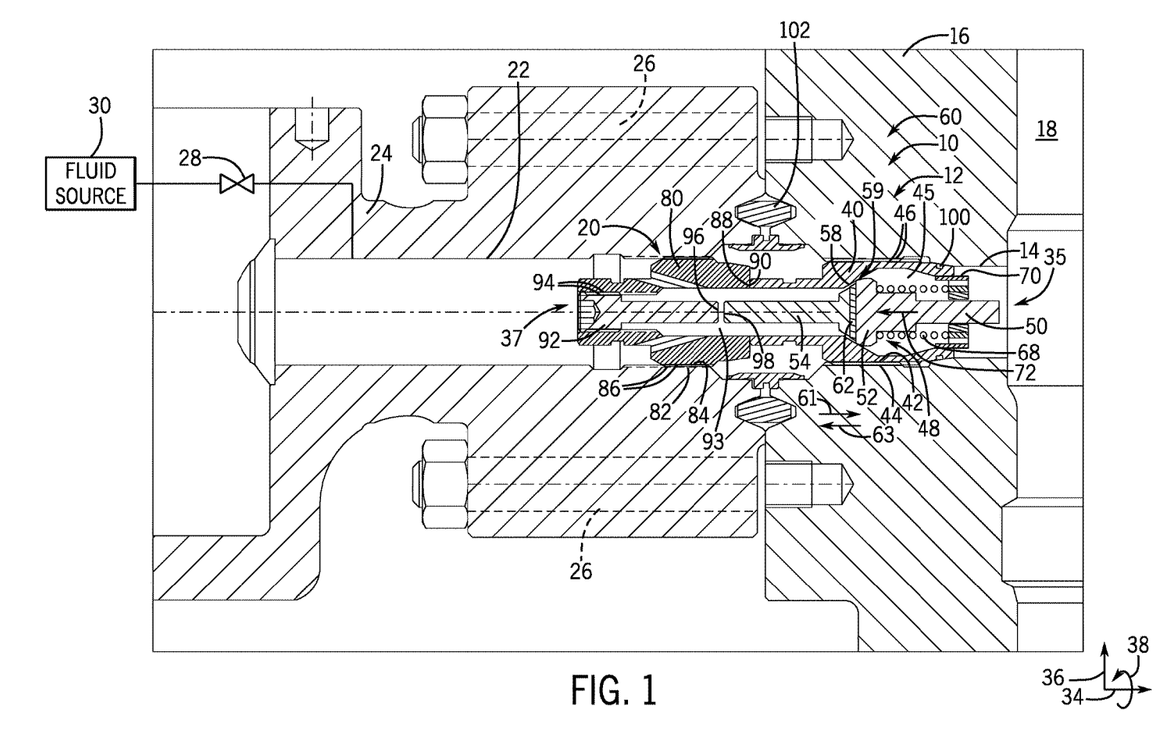
FIG. 1 is a cross-sectional side view of a valve removal (VR) plug assembly in a closed position, in accordance with an embodiment of the present disclosure.

Certain embodiments of the present disclosure include a flow control assembly (e.g., valve assembly) configured to facilitate fluid flow into and/or out of a wellhead component. The flow control assembly disclosed herein may be adapted for use within any suitable portion of a mineral extraction system that is configured to extract minerals (e.g., hydrocarbons) and/or inject other substances, such as chemicals used to improve the recovery of the mineral resources. Furthermore, the flow control assembly may be utilized within mineral extraction systems that are land-based (e.g., a surface system) or sub-sea (e.g., a sub-sea system). To facilitate discussion, certain examples provided herein relate to a valve removal (VR) plug assembly that is configured to be positioned within a passageway (e.g., outlet or channel) formed in a wellhead component, such as a tubing head. However, it should be understood that the disclosed components and features may be adapted for use with other types of flow control assemblies, such as any of a variety of gate valves, check valves, gas lift valves, or the like, positioned within any suitable wellhead component, such as a tubing head, a casing head, a Christmas tree, a surface manifold, or the like With the foregoing in mind, FIG. 1 is a cross-sectional side view of an example of a flow control assembly, such as a valve removal (VR) plug assembly 10, in accordance with an embodiment of the present disclosure. As shown, a first portion 12 of the VR plug assembly 10 is positioned within a passageway 14 (e.g., outlet or channel) formed in a wellhead component 16 (e.g., annular wellhead component, such as a tubing head) that defines a bore 18 that extends toward a sub-surface wellbore, and a second portion 20 of the VR plug assembly 10 is positioned within a passageway 22 (e.g., channel) formed in a body 24 (e.g., valve body) that is coupled to the wellhead component 16. As shown, the body 24 is coupled to the wellhead component 16 via one or more fasteners 26 (e.g., threaded fasteners, such as bolts). When the body 24 is coupled to the wellhead component 16, the passageways 14, 22 are aligned with one another to enable the VR plug assembly 10 to extend into and between the passageways 14, 22. In some embodiments, the body 24 may support or house a valve 28 that is configured to adjust a fluid flow from a fluid source 30 into the passageway 22. For example, in some embodiments, the valve 28 is configured to move between an open position in which the valve 28 enables fluid flow into the passageway 22, and a closed position in which the valve 28 blocks fluid flow into the passageway 22. While the valve 28 is illustrated schematically in a position adjacent to the body 24 for clarity, it should be understood that the valve 28 and its related components may be supported, housed, or internal to the body 24. To facilitate discussion, the VR plug assembly 10, and the related components, may be described with reference to an axial axis or direction 34, a radial axis or direction 36, and a circumferential axis or direction 38. As shown, the VR plug assembly 10 extends between a first end 35 (e.g., a distal end) and a second end 37 (e.g., proximal end).

The first portion 12 of the VR plug assembly 10 includes a plug body 40 (e.g., annular plug body) configured to be positioned within the passageway 14 of the wellhead component 16. As shown, a radially-outer surface 42 (e.g., annular surface) of the plug body 40 is configured to contact and to couple to a radially-inner surface 44 (e.g., annular surface) of the wellhead component 16. For example, in the illustrated embodiment, the radially-outer surface 42 and the radially-inner surface 44 include respective threads 46 that are configured to threadably couple the plug body 40 to the wellhead component 16 at a threaded interface. As shown, a valve member 48 is positioned within a cavity 45 (e.g., central and axially-extending cavity) of the plug body 40. The illustrated valve member 48 includes a first stem 50 (e.g., distal stem), a seal member 52, and a second stem 54 (e.g., proximal stem). The seal member 52 is positioned between the first stem 50 and the second stem 54 along the axial axis 34. The seal member 52 has an expanded diameter (e.g., as compared to the stems 50, 54), and a radially-outer surface 56 (e.g., annular surface) of the seal member 52 is configured to contact and/or seal against (e.g., form an annular seal 59 between) a corresponding portion 58 of the radially-inner surface 44 of the plug body 40 when the VR plug assembly 10 is in the illustrated closed position 60. Thus, in the closed position 60, the annular seal 59 blocks fluid flow axially across the VR plug assembly 10. As shown, the radially-outer surface 56 of the seal member 52 and the corresponding portion 58 of the radially-inner surface 44 of the plug body 40 are tapered (e.g., conical surfaces) in opposite directions along the axial axis 34 of the VR plug assembly 10 to facilitate formation of the annular seal 59. In certain embodiments, a sealing ring 62 (e.g., annular sealing ring) may be provided about the radially-outer surface 56 of the seal member 52 to form the annular seal 59. The sealing ring 62 may be formed from any suitable material, such as a metal (e.g., metal or metal alloy) and/or an elastomer material.

In the illustrated embodiment, a biasing member 68 (e.g., spring) supported by a seat 70 (e.g., annular seat) biases the valve member 48 away from the seat 70 and toward the closed position 60, as shown by arrow 72. As shown, in the closed position 60, the biasing member 68 is in an expanded position. As discussed in more detail below, fluid flow (e.g., from the fluid source 30 via operation of the valve 28) within the passageway 22 may drive the valve member 48 away from the corresponding portion 58 of the radially-inner surface 44 of the plug body 40, thereby creating a gap (e.g., breaking or opening the annular seal 59) to enable the fluid to flow through the VR plug assembly 10 into the bore 18. Thus, the first portion 12 of the VR plug assembly 10 may be configured to generally operate as a check valve (e.g., one-way valve or non-return valve) that enables fluid flow across the VR plug assembly 10 in a first direction 61 and that blocks fluid flow across the VR plug assembly 10 in a second direction 63.

The second portion 20 of the VR plug assembly 10 includes an energizing plug body 80 (e.g., annular energizing plug body or annular pin support structure) configured to be positioned within the passageway 22 of the body 24. As shown, a radially-outer surface 82 (e.g., annular surface) of the energizing plug body 80 is configured to contact and to couple to a radially-inner surface 84 (e.g., annular surface) of the body 24. For example, in the illustrated embodiment, the radially-outer surface 82 and the radially-inner surface 84 include respective threads 86 that are configured to threadably couple the energizing plug body 80 to the body 24 at a threaded interface. The energizing plug body 80 may be positioned within the passageway 22 such that a contacting surface 88 (e.g., axially-facing contacting surface) of the energizing plug body 80 contacts and/or seals against a contacting surface 90 (e.g., axially-facing contacting surface) of the plug body 40 when the body 24 is coupled to the wellhead component 16.

As shown, a pin 92 (e.g., actuator, axially-extending actuator) is positioned within a cavity 93 (e.g., central and/or axially-extending cavity) of the energizing plug body 80. The pin 92 may be coupled to the energizing plug body 80, such as via corresponding threads 94. As discussed in more detail below, the pin 92 may be configured to move axially relative to the energizing plug body 80 (e.g., via rotation of the pin 92) until a contacting surface 96 (e.g., axially-facing contacting surface) of the pin 92 contacts and exerts an axial force on a contacting surface 98 (e.g., axially-facing contacting surface) of the valve member 48, thereby driving the valve member 48 axially relative to the plug body 40 and creating the gap between the seal member 52 of the valve member 48 and the plug body 40. Thus, the second portion 20 of the VR plug assembly 10 may include structural components that are configured to mechanically override the biasing member 68 and drive and/or hold the VR plug assembly 10 in the open position. Such a configuration may enable venting the bore 18 or flowing fluid from the bore 18 into the passageway 22 in the second direction 63 across the VR plug assembly 10 while the VR plug assembly 10 is mechanically held in the open position.

It should be understood that various seals (e.g., annular seals, gaskets, or the like) may be positioned about the VR plug assembly 10. For example, in the illustrated embodiment, a seal 100 (e.g., annular seal) is positioned between the plug body 40 and the wellhead component 16 proximate to the distal end 35 of the VR plug assembly 10, and a gasket 102 (e.g., annular gasket) is positioned between the wellhead component 16 and the body 24.

Figure 2:
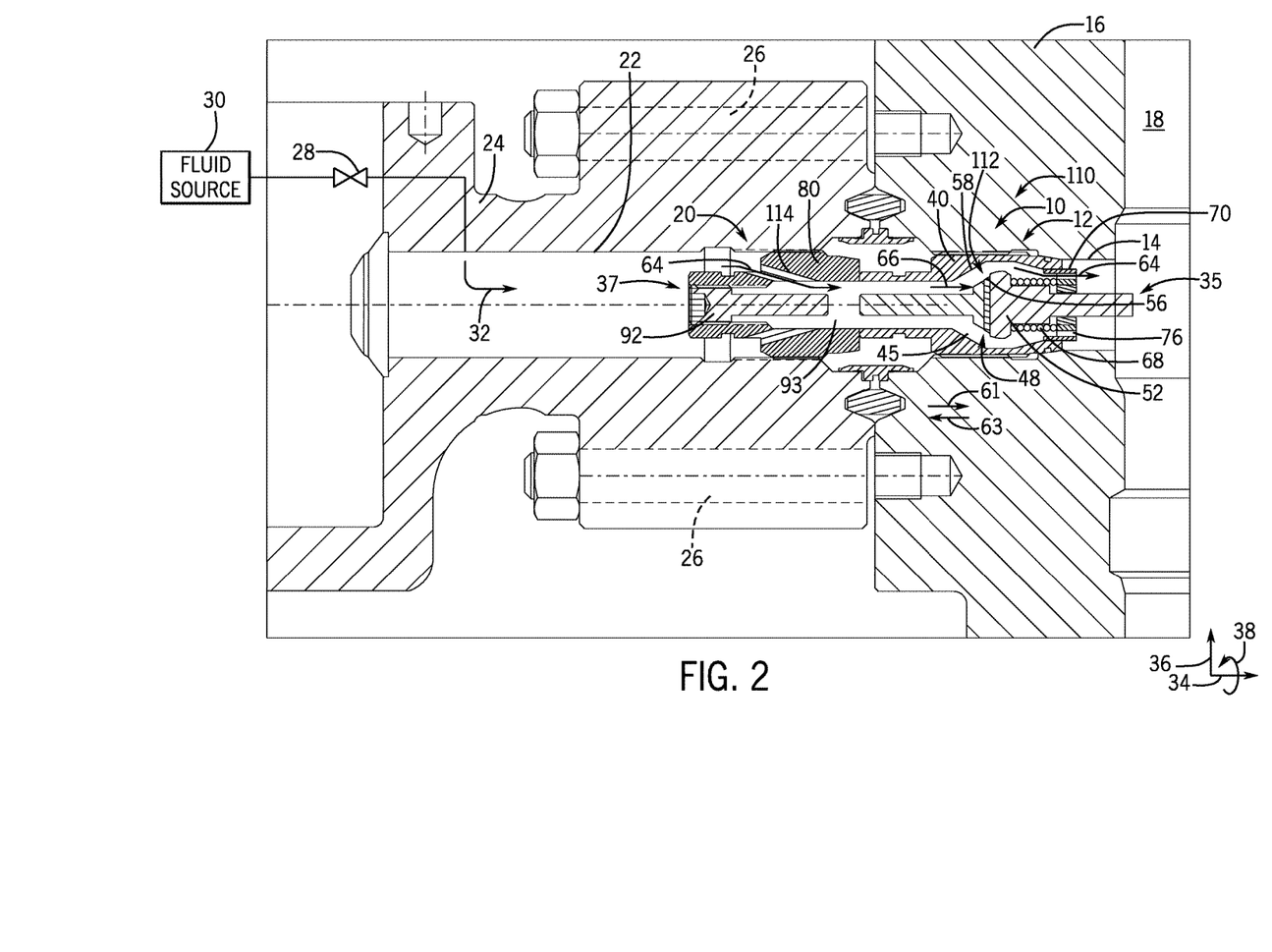
FIG. 2 is a cross-sectional side view of the VR plug assembly of FIG. 1 in an open position, in accordance with an embodiment of the present disclosure.

FIG. 2 illustrates the VR plug assembly 10 in an open position 110. In the open position 110, the seal member 52 of the valve member 48 is separated from the plug body 40 by a gap 112 (e.g., annular gap) to enable fluid flow axially across the VR plug assembly 10. Thus, in the open position 110, the passageway 22 and the bore 18 are in fluid communication with one another, such as via one or more passageways 76 (e.g., axially-extending passageways) formed in the seat 70, the cavities 45, 93, the gap 112, and/or one or more passageways 114 (e.g., radially and/or axially-extending passageways) formed in the energizing plug body 80. As shown, in the open position 110, the biasing member 68 is in a compressed position.

As noted above, the VR plug assembly 10 may be driven into the open position 110 by fluid within the passageway 22. For example, when the valve 28 is controlled to the open position to enable fluid flow from the fluid source 30 into the passageway 22, as shown by arrow 32, the fluid may travel through the VR plug assembly 10, as shown by arrows 64. The fluid may exert a force 66 on the valve member 48. When fluid pressure exceeds a threshold pressure, the force 66 overcomes the biasing force of the biasing member 68, compresses the biasing member 68, and drives the valve member 48 axially relative to the plug body 40, thereby creating the gap 112 between the seal member 52 of the valve member 48 and the plug body 40. Accordingly, the fluid may flow in the first direction across the VR plug assembly 10 and into the bore 18. In this manner, the VR plug assembly 10 may enable fluid injection into the bore 18.

Figure 3:
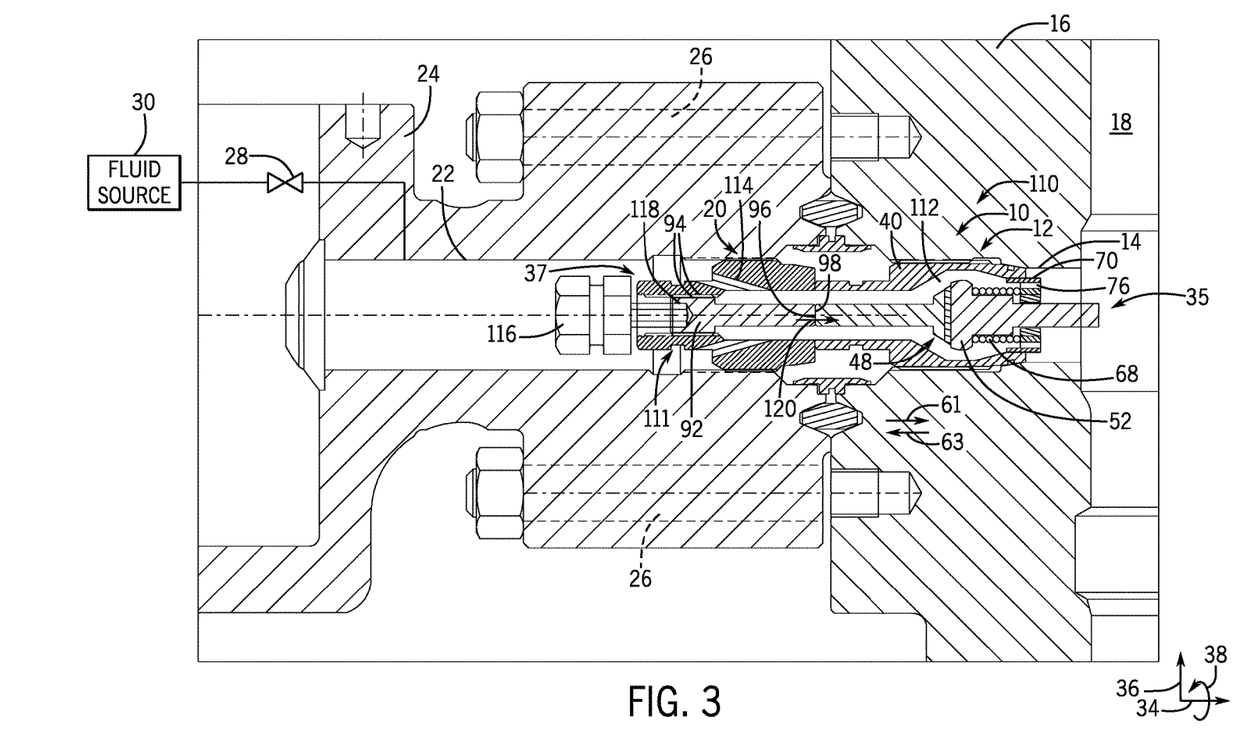
FIG. 3 is a cross-sectional side view of the VR plug assembly of FIG. 1 in the open position with a pin engaging a valve member, in accordance with an embodiment of the present disclosure.

As noted above, in some embodiments, it may be desirable to mechanically override the biasing member 68 and/or hold the VR plug assembly 10 in the open position 110, which may enable venting the bore 18 or flowing fluid from the bore 18 into the passageway 22 in the second direction 63 across the VR plug assembly 10, for example. With the foregoing in mind, FIG. 3 is a cross-sectional side view of the VR plug assembly 10 in the open position 110 with the pin 92 mechanically supporting (e.g., contacting, holding, exerting an axial force against) the valve member 48 to maintain the gap 112 and enable fluid flow across the VR plug assembly 10.

In operation, a tool 116 (e.g., an energizing tool) may be utilized to move the pin 92 axially relative to the energizing plug body 80. For example, the tool 116 may be utilized to move the pin 92 from a first position (e.g., retracted position) to a second position 111 (e.g., extended or advanced position) in which the pin 92 contacts and drives the valve member 48 from the closed position 60 shown in FIG. 1 to the open position 110 shown in FIG. 3. In certain embodiments, the tool 116 may be inserted into and/or coupled (e.g., threadably coupled) to a corresponding recess 118 of the pin 92 (e.g., tool-engageable recess, such as a hex-shaped recess or polygonal recess, that forms a torque-transfer interface. Rotation of the tool 116 (e.g., via another tool, extended handle, or actuator) may cause rotation of the pin 92, and thus, may cause the pin 92 to move in the axial direction 34 relative to the energizing plug body 80 as the pin 92 rotates through the corresponding threads 94 of the energizing plug body 80.

Eventually, due to rotation of the pin 92, the contacting surface 96 of the pin 92 may contact the contacting surface 98 of the valve member 48 and may exert a force 120 (e.g., axial force) that drives the valve member 48 in the axial direction 34 relative to the plug body 40. In this manner, the VR plug assembly 10 may be mechanically driven to be held in the open position 110, and may enable fluid flow in the second direction 63 across the VR plug assembly 10. In such cases, the VR plug assembly 10 may be returned to the closed position 60 by rotating the tool 116 in an opposite direction that causes the pin 92 to retract and move away from the valve member 48, which in turn enables the biasing member 68 to drive the valve member 48 into the closed position 60.

Figure 4:
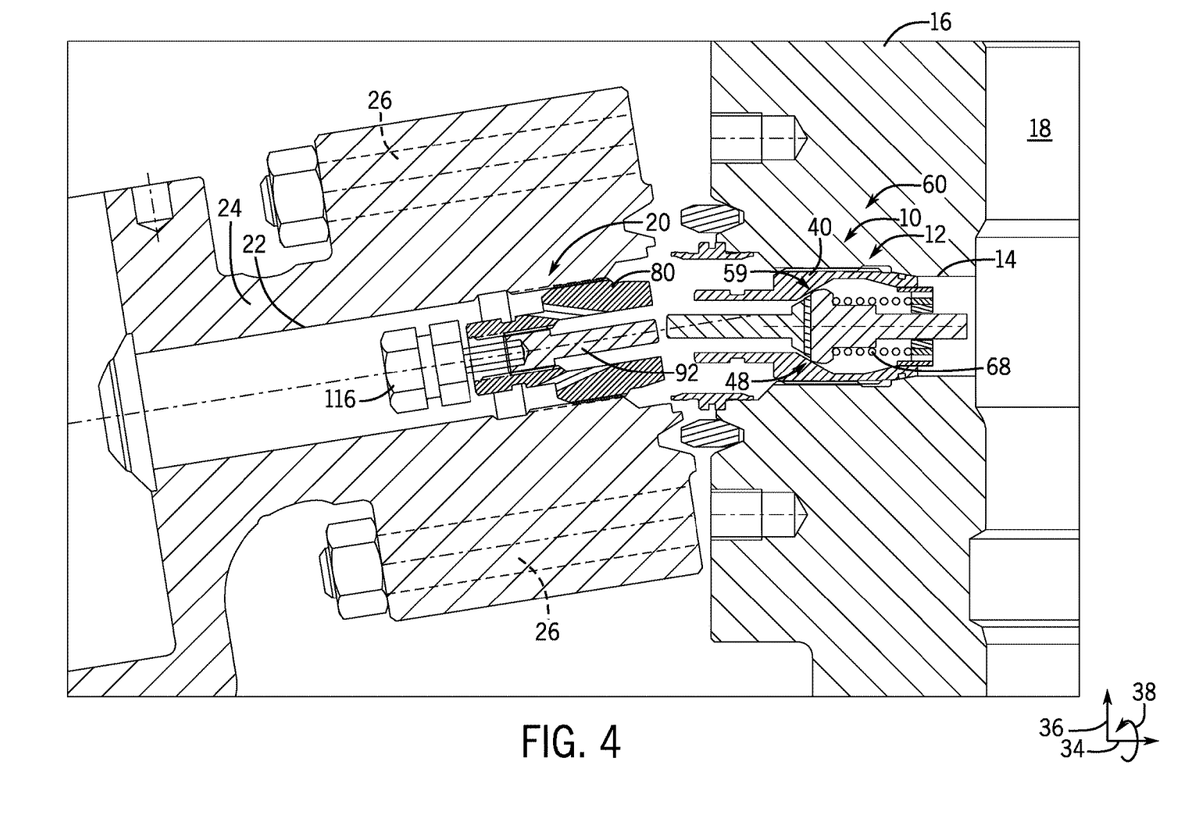
FIG. 4 is a cross-sectional side view of the VR plug assembly of FIG. 1 after separation of a body from a wellhead component, in accordance with an embodiment of the present disclosure.

In certain circumstances, the body 24 may separate from the wellhead component 16. For example, another component or piece of equipment may be inadvertently dropped on or contact the body 24, causing the fasteners 26 to break and causing the body 24 to separate from the wellhead component 16. Advantageously, certain embodiments of the present disclosure enable the VR plug assembly 10 to automatically move from the open position 110 to the closed position 60 in which the valve member 48 seals against the plug body 40 when the body 24 separates from the wellhead component 16. With the foregoing in mind, FIG. 4 is a cross-sectional side view of the VR plug assembly 10 after separation of the body 24 from the wellhead component 16, in accordance with an embodiment of the present disclosure.

As shown, the first portion 12 of the VR plug assembly 10 (e.g., the plug body 40 and valve member 48) remains coupled to the passageway 14 of the wellhead component 16, and the second portion 20 of the VR plug assembly 10 (e.g., the energizing plug body 80 and the pin 92) separates from the first portion 12 of the VR plug assembly 10 as the body 24 separates from the wellhead component 16. In some embodiments, the second portion 20 of the VR plug assembly 10 may remain coupled to the body 24 as the body 24 separates from the wellhead component 16.

In the illustrated embodiment, the energizing plug body 80 is coupled (e.g., threadably coupled) to the body 24, and the pin 92 is coupled (e.g., threadably coupled) to the energizing plug body 80. As shown, the plug body 40 is coupled (e.g., threadably coupled) to the wellhead component 16, and the valve member 48 is coupled (e.g., threadably coupled) to the plug body 40. Accordingly, as the body 24 separates from the wellhead component 16, the energizing plug body 80 and the pin 92 move away from the wellhead component 16. Once the pin 92 separates from the valve member 48, the pin 92 no longer biases the valve member 48 to the open position 110 and the biasing member 68 drives the valve member 48 into the closed position 60. Thus, the VR plug assembly 10 automatically closes in response to a breakage or separation of the body 24.

The VR plug assembly 10 may include various features to facilitate separation of the second portion 20 from the first portion 12 and/or facilitate automatic return of the VR plug assembly 10 to the closed position 60. For example, as shown in FIG. 2, when the VR plug assembly 10 is in the open position 110, the energizing plug body 80 and/or the pin 92 do not overlap the plug body 40 and/or the valve member 48 along the axial axis 34. Thus, when the body 24 separates from the wellhead component 16, the second portion 20 of the VR plug assembly 10 may not be trapped or entangled by components of the first portion 12 of the VR plug assembly 10. In certain embodiments, the components of the second portion 20 (e.g., the energizing plug body 80 and/or the pin 92) are not directly coupled to the wellhead component 16 or components of the first portion 12 of the VR plug assembly 10. In certain embodiments, the components of the second portion 20 (e.g., the energizing plug body 80 and/or the pin 92) do not directly physically contact the wellhead component 16 and/or only contact components of the first portion 12 of the VR plug assembly 10 via respective axially-facing surfaces 88, 90, 96, 98.

As noted above, the VR plug assembly 10 may include various passageways, such as the passageways 76, 114 to facilitate fluid flow across the VR plug assembly 10. These passageways 76, 114 may be positioned at any suitable location about the VR plug assembly 10. Additionally, any suitable number of passageways 76, 114 may be positioned at discrete locations about the circumference of the VR plug assembly 10. Furthermore, the fluid from the fluid source 30 may enter the passageway 22 at any suitable axial location, and the fluid from the bore 18 may exit the passageway 22 at any suitable axial location. For example, one or more outlets may extend radially through the energizing plug body 80, the body 24, the plug body 40, and/or other structures associated with the VR plug assembly 10 to facilitate fluid flow across the VR plug assembly 10.

Figure 5:
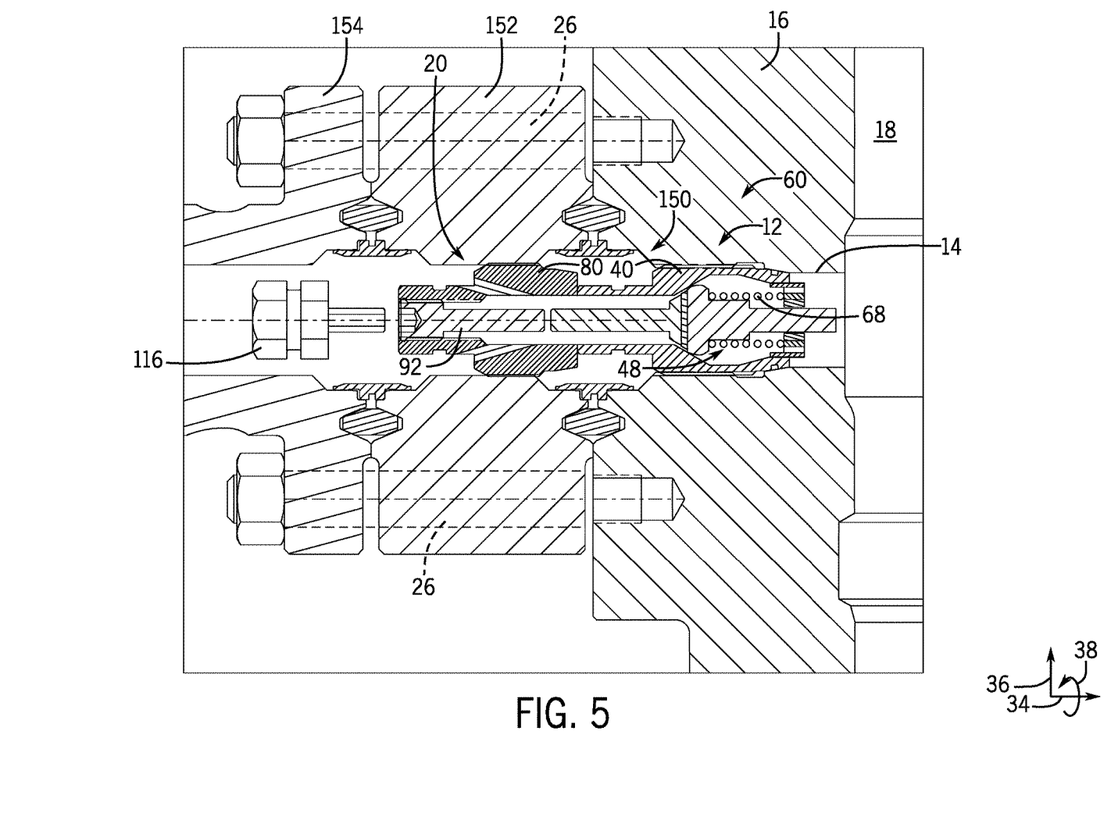
FIG. 5 is a cross-sectional side view of a VR plug assembly having an energizing plug body coupled to a spacer that is positioned between a valve body and a wellhead component, in accordance with an embodiment of the present disclosure.

FIG. 5 is a cross-sectional side view of a VR plug assembly 150 in which the energizing plug body 80 is coupled to a spacer 152 (e.g., annular support structure) that is positioned between a valve body 154 (e.g., body supporting and/or housing the valve 28) and the wellhead component 16 along the axial axis 34, in accordance with an embodiment of the present disclosure. In FIGS. 1-5, the energizing plug body 80 is directly coupled to the body 24, which may be a valve body supporting or housing the valve 28. However, in certain embodiments, the spacer 152 may enable use of the VR plug assembly 150 with a variety of different valve bodies and/or existing valve bodies (e.g., the VR plug assembly 150 may be compatible with and/or retrofitted to various valve bodies). In the illustrated embodiment, separation of the spacer 152 from the wellhead component 16 while the VR plug assembly 150 is in the open position 110 (e.g., held in the open position 110 via the pin 92) causes the pin 92 to separate from the valve member 48 and enables the valve member 48 to return to the closed position 60, in a similar manner as described above with respect to FIG. 4.

Figure 6:
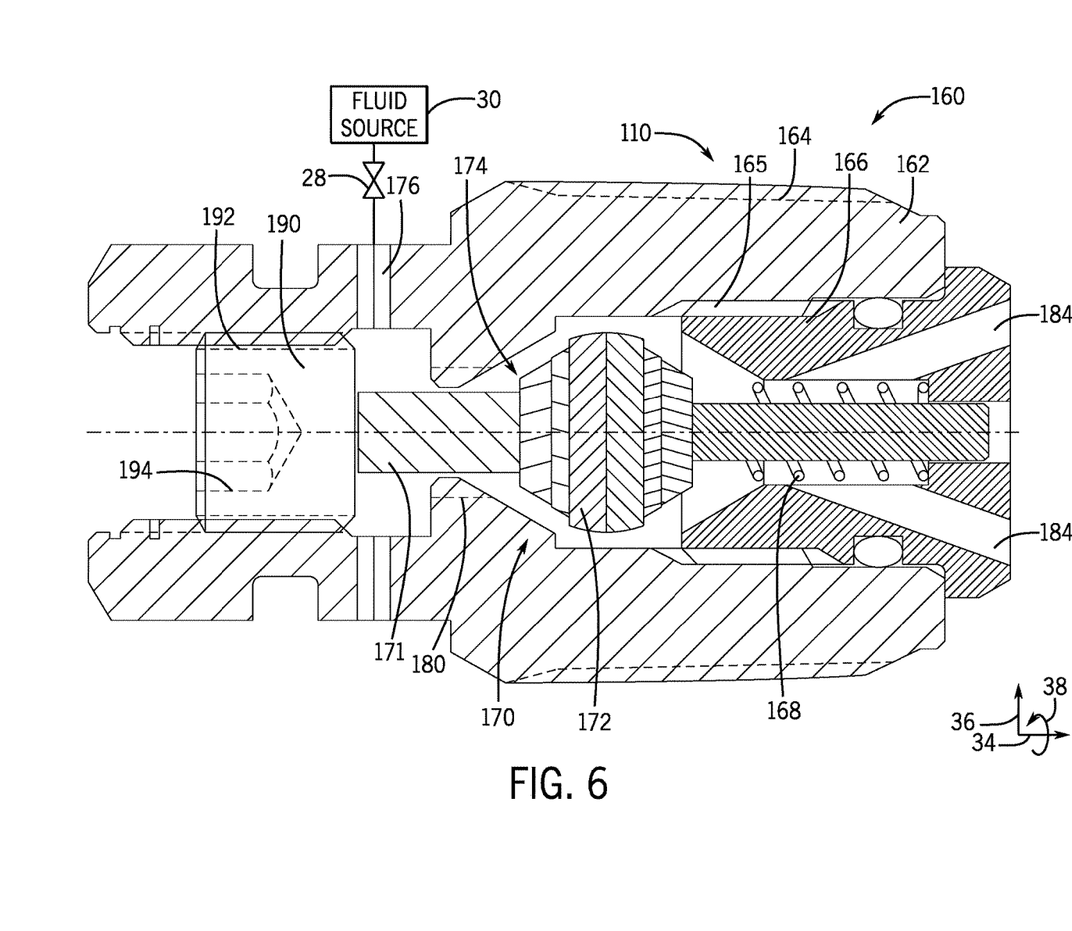
FIG. 6 is a cross-sectional side view of a VR plug assembly having various flow paths, in accordance with an embodiment of the present disclosure.

FIG. 6 is a cross-sectional side view of a VR plug assembly 160, in accordance with an embodiment of the present disclosure. In the illustrated embodiment, the VR plug assembly 160 includes a plug body 162 (e.g., annular plug body) that is configured to be coupled to the wellhead component 16. For example, the plug body 162 may be positioned within and threadably coupled (e.g., via threads 164) to a passageway (e.g., the passageway 14) of the wellhead component 16. As shown, a support ring 166 (e.g., annular support ring) is positioned within a cavity 165 of the plug body 162 and is coupled (e.g., threadably coupled via threads 165) to the plug body 162. The support ring 166 may circumferentially surround and/or support a biasing member 168 (e.g., spring) that is configured to bias a valve member 170 toward the closed position (e.g., the closed position 60) in which a seal member 172 of the valve member 170 contacts and/or seals against (e.g., forms an annular seal with) the plug body 162.

Thus, the valve member 170 may act as a check valve (e.g., one-way valve, non-return valve) similar to the valve member 48 described above with respect to FIGS. 1-5. For example, the valve member 170 may remain in the closed position to block fluid flow across the VR plug assembly 160 until a fluid pressure on a first side 174 of the seal member 172 overcomes a biasing force of the biasing member 168 to drive the valve member 170 into the illustrated open position 110. In the illustrated embodiment, fluid ports 176 extend radially through the plug body 162 to the cavity 165. Thus, fluid (e.g., from the fluid source 30 via operation of the valve 28) may be provided into the cavity 165 via the fluid ports and/or fluid that passes through the VR plug assembly 160 from the bore 18 may be extracted via the fluid ports 176. Each fluid port 176 may have a radius of at least 0.25, 0.27, 0.30, 0.38, or 0.5 centimeters (cm), or between approximately 0.25 to 0.5, 0.27 to 0.45, or 0.30 to 0.38 cm. Any suitable number (e.g., 1, 2, 3, 4, 5, 6, 7, 8, 9, 10, or more) of fluid ports 176 may be positioned at discrete locations about the circumference of the plug body 162.

In certain embodiments, the VR plug assembly 160 may include features to facilitate fluid flow across the VR plug assembly 160. For example, the VR plug assembly 160 may include one or more slots 180 (e.g., axially-extending slots) formed in the plug body 162. In some embodiments, the one or more slots 180 may be open to the cavity 165 and/or may provide a greater flow area (e.g., as compared to the plug body 162 that is devoid of the one or more slots 180) between a stem 171 of the valve member 170 and the plug body 162. In the illustrated embodiment, the one or more slots 180 are positioned between the seal member 172 and the fluid ports 176 along the axial axis 34. However, it should be understood that the one or more slots 180 may be positioned at any suitable axial location of the plug body 162. Any suitable number (e.g., 1, 2, 3, 4, 5, 6, 7, 8, 9, 10, or more) of slots 180 may be positioned at discrete locations about the circumference of the plug body 162.

Additionally or alternatively, one or more passageways 184 (e.g., radially and/or axially-extending holes) may be formed in the support ring 166. In the illustrated embodiment, the one or more passageways 184 extend radially and axially from a first surface (e.g., distal surface, axially-facing surface) of the support ring 166 to a second surface (e.g., radially-inner surface) of the support ring 166. The configuration of the support ring 166 may enable the one or more passageways 184 to have the illustrated angled orientation relative to the axial axis 34, which may advantageously improve fluid flow and/or increase flow area through the VR plug assembly 10. For example, a radius of at least one passageway 184 may be at least 0.25, 0.38, or 0.5 cm and/or a flow area of at least one passageway 184 may be at least 0.12, 0.15, 0.17, 0.2, 0.22, 0.25, 0.5, or 0.75 square cm, or between approximately 0.12 to 0.75, 0.15 to 0.5, or 0.17 to 0.25 square cm. Any suitable number (e.g., 1, 2, 3, 4, 5, 6, 7, 8, 9, 10 or more) of passageways 184 may be positioned at discrete locations about the circumference of the support ring 166.

In the illustrated embodiment, a cap 190 is coupled (e.g., threadably coupled via threads 192) to the plug body 162. The cap 190 may include a recess 194 (e.g., tool-engageable recess, such as a hex-shaped recess or polygonal recess, that forms a torque-transfer interface) that is configured to receive a tool (e.g., the tool 116), and rotation of the tool may drive the cap 190 along the axial axis 34. In turn, the cap 190 may contact and/or drive the valve member 170 along the axial axis 34 to mechanically compress the biasing member 168 and to drive the VR plug assembly 160 into the open position 110, thereby enabling fluid to flow across the VR plug assembly 160. However, it should be understood that the various features of the VR plug assembly 160 shown in FIG. 6 may be utilized in the VR plug assembly 10 of FIGS. 1-4 and/or the VR plug assembly 150 of FIG. 5. For example, the support ring 166, the radially-extending fluid ports 176, the slots 180, and/or the passageways 184 may be incorporated into the VR plug assembly 10 of FIGS. 1-4 and/or the VR plug assembly 150 of FIG. 5. Similarly, any of the various features described above with respect to FIGS. 1-5 may be utilized in the VR plug assembly 160 of FIG. 6. Indeed, any of the various features described above with respect to FIGS. 1-6 may be combined in any suitable manner to form a VR plug assembly.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
    a flow control assembly, comprising:
        a first portion configured to be positioned within and to be coupled to a first passageway formed in a wellhead component; and
        a second portion configured to be coupled to a second passageway formed in a body that is configured to be coupled to the wellhead component;
        wherein an actuator of the second portion is configured to move along an axial axis to drive a valve member of the first portion into an open position to enable fluid flow across the flow control assembly, and the actuator does not overlap any components of the first portion along the axial axis while the actuator drives the valve member of the first portion into the open position;
        wherein the body is configured to support a valve that is configured to adjust a flow of fluid from a fluid source into the second passageway, and wherein the flow of fluid from the fluid source is configured to drive the valve member along the axial axis from a closed position into the open position to enable the flow of fluid to travel across the flow control assembly into a bore defined by the wellhead component while the actuator is separated from the valve member.

2. The system of claim 1, wherein the valve member is configured to automatically return to the closed position to block fluid flow across the flow control assembly if the body separates from the wellhead component.

3. The system of claim 1, wherein the first portion comprises an annular plug body that is configured to be threadably coupled to the first passageway formed in the wellhead component, and the annular plug body defines a cavity that houses the valve member.

4. The system of claim 3, comprising a biasing member positioned within the cavity, wherein the biasing member is configured to bias the valve member toward the closed position in which the valve member blocks fluid flow across the flow control assembly.

5. The system of claim 1, wherein the second portion comprises an annular energizing plug body that is configured to be threadably coupled to the second passageway formed in the body, and the annular energizing plug body defines a cavity that houses the actuator.

6. The system of claim 5, wherein the actuator is threadably coupled to the annular energizing plug body.

7. The system of claim 6, wherein the actuator comprises a recess that is configured to receive a tool, and rotation of the tool is configured to cause rotation of the actuator and to drive the actuator along the axial axis relative to the annular energizing plug body.

8. The system of claim 1, wherein the actuator does not overlap the wellhead component along the axial axis while the actuator drives the valve member of the first portion into the open position.

9. A flow control assembly, comprising:
    an annular plug body configured to be positioned within and to be coupled to a first passageway formed in a wellhead component;
    a valve member positioned within a first cavity of the annular plug body, wherein the valve member is configured to move in an axial direction relative to the annular plug body between a closed position in which the valve member forms an annular seal with the annular plug body to block fluid flow across the flow control assembly and an open position in which a gap is provided between the valve member and the annular plug body to enable fluid flow across the flow control assembly;
    an annular energizing plug body configured to be positioned within and to be coupled to a second passageway formed in a body that is configured to be coupled to the wellhead component; and
    an actuator positioned within a second cavity of the annular energizing plug body and threadably coupled to the annular energizing plug body, wherein rotation of the actuator causes the actuator to move toward the valve member in the axial direction relative to the annular energizing plug body to drive the valve member from the closed position to the open position, and the actuator is configured to disengage from the valve member to enable the valve member to move from the open position to the closed position when the body separates from the wellhead component.

10. The flow control assembly of claim 9, comprising a biasing member configured to bias the valve member toward the closed position.

11. The flow control assembly of claim 9, wherein the annular plug body is threadably coupled to the first passageway, and the annular energizing plug body is threadably coupled to the body.

12. The flow control assembly of claim 9, wherein the actuator comprises a recess that is configured to receive a tool such that rotation of the tool causes the rotation of the actuator.

13. The flow control assembly of claim 9, wherein the body is configured to support a valve that is configured to adjust a flow of fluid from a fluid source into the second passageway, and the flow of fluid from the fluid source is configured to drive the valve member into the open position to enable the flow of fluid from the fluid source to travel across the flow control assembly into a bore defined by the wellhead component.

14. The flow control assembly of claim 9, wherein the flow control assembly is a valve removal plug assembly and the wellhead component is a tubing head.

15. A system, comprising:
    a body configured to be coupled to a wellhead component;
    a flow control assembly, comprising:
        a first portion configured to be positioned within and to be coupled to a first passageway formed in the wellhead component;
        a second portion positioned within and coupled to a second passageway formed in the body;
        wherein a component of the second portion is configured to engage a corresponding component of the first portion to cause the flow control assembly to move from a closed position to an open position to enable a first flow of fluid to travel across the flow control assembly in a first direction from a bore of the wellhead component to the second passageway while the body is coupled to the wellhead component, the corresponding component of the first portion is configured to move in response to a second flow of fluid flowing in a second direction from the second passageway toward the bore of the wellhead component to cause the flow control assembly to move from the closed position to the open position to enable the second flow of fluid to travel across the flow control assembly in the second direction while the body is coupled to the wellhead component and while the component is disengaged from the corresponding component, and separation of the body from the wellhead component causes the component to disengage from the corresponding component to enable the flow control assembly to move to the closed position in which fluid flow across the flow control assembly is blocked.

16. The system of claim 15, comprising a biasing member configured to bias the corresponding component of the first portion toward the closed position.

17. The system of claim 15, wherein the component comprises a recess that is configured to receive a tool such that rotation of the tool causes rotation of the component and drives the component in an axial direction to engage the corresponding component.

18. A system, comprising:
a flow control assembly, comprising:
　a first portion configured to be positioned within and to be coupled to a first passageway formed in a wellhead component; and
　a second portion configured to be coupled to a second passageway formed in a body that is configured to be coupled to the wellhead component;
wherein the second portion comprises an annular energizing plug body that is configured to be threadably coupled to the second passageway formed in the body, and the annular energizing plug body defines a cavity that houses an actuator;
wherein the actuator of the second portion is configured to move along an axial axis to drive a valve member of the first portion into an open position to enable fluid flow across the flow control assembly, and the actuator does not overlap any components of the first portion along the axial axis while the actuator drives the valve member of the first portion into the open position.

19. A flow control assembly, comprising:
an annular plug body configured to be positioned within and to be coupled to a first passageway formed in a wellhead component;
a valve member positioned within a first cavity of the annular plug body, wherein the valve member is configured to move in an axial direction relative to the annular plug body between a closed position in which the valve member forms an annular seal with the annular plug body to block fluid flow across the flow control assembly and an open position in which a gap is provided between the valve member and the annular plug body to enable fluid flow across the flow control assembly;
an annular energizing plug body configured to be positioned within and to be coupled to a second passageway formed in a body that is configured to be coupled to the wellhead component; and
an actuator positioned within a second cavity of the annular energizing plug body, wherein the actuator is configured to move toward the valve member in the axial direction relative to the annular energizing plug body to drive the valve member from the closed position to the open position, and the actuator is configured to disengage from the valve member to enable the valve member to move from the open position to the closed position when the body separates from the wellhead component;
wherein the flow control assembly is a valve removal plug assembly and the wellhead component is a tubing head.

* * * * *